UNITED STATES PATENT OFFICE.

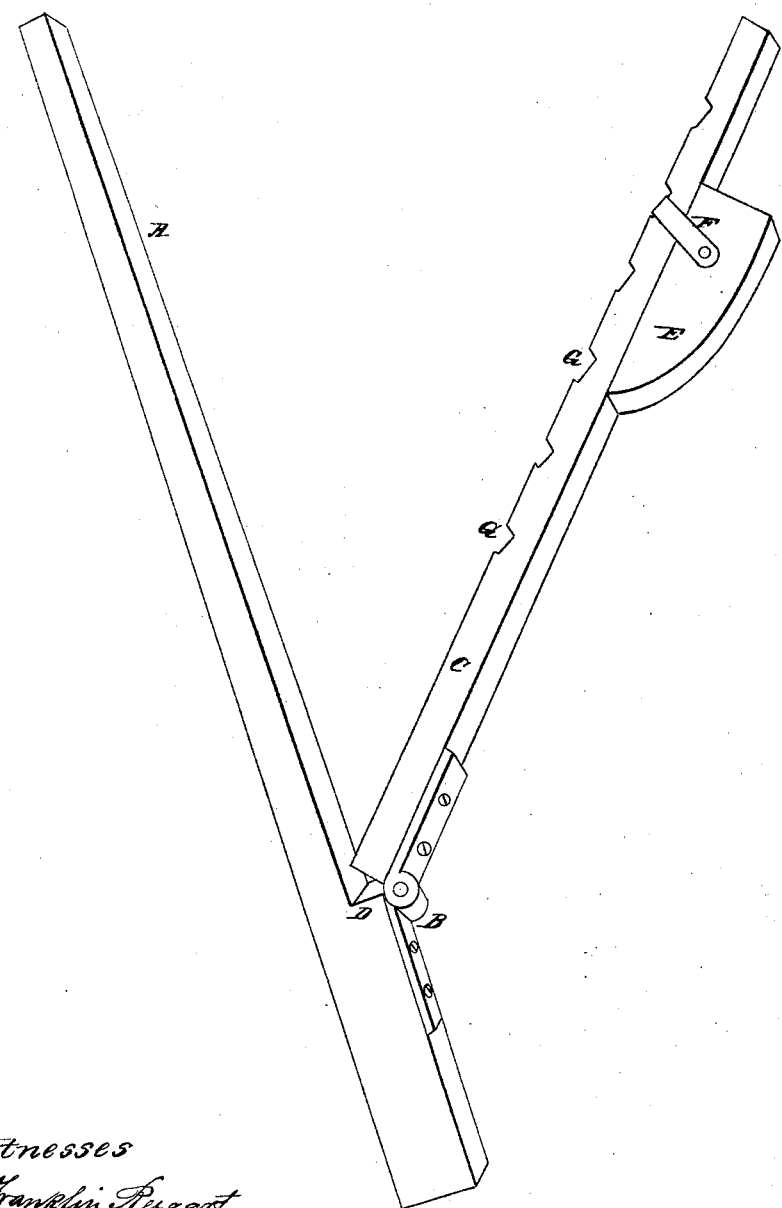

FREDERICK STAMM, OF LAMPETER TOWNSHIP, LANCASTER COUNTY, PENNSYLVANIA.

LEVER-JACK.

Specification of Letters Patent No. 23,273, dated March 15, 1859.

*To all whom it may concern:*

Be it known that I, FREDERICK STAMM, of Lampeter township, county of Lancaster, and State of Pennsylvania, have invented new and useful Improvements in Lever-Jacks; and I do hereby declare that the following is a full and exact description thereof, reference being had to the accompanying drawings, and to the letters of reference marked thereon, making a part of this specification.

The nature of my invention consists in combining a link rod, by a hinge, to a lever—the link rod having a block, link and link seats—for the purpose of raising up carriages or other heavy weights.

A represents the lever having a hinge B to which a link rod C is attached. The hinge B is located below the center of the main lever A and the link rod C operates with the hinge, the lower end of the link rod resting on the offset D of the lever A.

The link rod C is about two thirds the length of the lever A, and on the outside of the link rod C is an adjustable or shifting block E, which is adjusted higher or lower (as may be required) by its link F (which encircles the rod).

On the outside of the rod C are angular shaped link seats G, in which the link F rests, when the lever is to be used for raising carriages or any heavy weights.

The block E is placed under the axle of a carriage, and the lower end of the lever A rests upon the ground. The main lever A is then pressed forward toward the link rod C, and the carriage commences to rise, until the lever is pressed close to the rod, when it is then permanently set.

I am aware that several kinds of lever jacks have been used—but I have the advantages of simplicity, applicability, durability and cheapness—and an important advantage in its being constructed so light, while its power is undiminished.

What I claim as my invention, and desire to secure by Letters Patent is—

The combination and arrangement of the lever and link rod hinged together, with the block and link seats as herein described, and for the purposes set forth.

F. STAMM.

Witnesses:
I. FRANKLIN REIGART,
M. CARPENTER.